US008505420B2

(12) United States Patent
Alfaro

(10) Patent No.: US 8,505,420 B2
(45) Date of Patent: Aug. 13, 2013

(54) MAGNETIZED HAND TOOLS

(76) Inventor: Nelson B. Alfaro, Mustang, OK (US)

( * ) Notice: Subject to any disclaimer, the term of this patent is extended or adjusted under 35 U.S.C. 154(b) by 240 days.

(21) Appl. No.: 13/161,135

(22) Filed: Jun. 15, 2011

(65) Prior Publication Data

US 2011/0308980 A1 Dec. 22, 2011

Related U.S. Application Data

(60) Provisional application No. 61/344,270, filed on Jun. 21, 2010.

(51) Int. Cl.
*B32B 23/16* (2006.01)
*B25H 3/00* (2006.01)
*B25G 1/00* (2006.01)

(52) U.S. Cl.
USPC ................................ 81/489; 81/900; 206/350

(58) Field of Classification Search
USPC ................ 81/489, 900, 177.1; 206/207, 350; 16/421, 430
See application file for complete search history.

(56) References Cited

U.S. PATENT DOCUMENTS 1,587,647 A 6/1926 Hood et al.
2,174,327 A 9/1939 Love
2,385,859 A 10/1945 Jacobson
5,472,253 A 12/1995 Resor
6,405,617 B1 6/2002 Collins
6,571,669 B2 6/2003 Benatz et al.
6,959,465 B1 * 11/2005 Foster ............................... 7/143
7,004,655 B2 * 2/2006 Ferrara ............................. 401/6
7,162,802 B2 * 1/2007 Benardeau et al. ............. 30/147
7,651,419 B2 * 1/2010 Brunner ......................... 473/523
2002/0178875 A1 12/2002 Lin
2003/0052143 A1 3/2003 Devine
2003/0151269 A1 * 8/2003 Korellis et al. ............... 294/171
2004/0088824 A1 5/2004 Hsien
2008/0283083 A1 * 11/2008 Piao ............................. 132/317

FOREIGN PATENT DOCUMENTS

CN 2578055 10/2008
JP 2004-57227 2/2004

OTHER PUBLICATIONS

Website, http://cqi.ebay.com/we/ehavisapi.d11?Viewitem&item=120524714254, Magnetic Handle Combination Wrench Set + Mounting Plate, one sheet printed from the internet on Apr. 13, 2010.

* cited by examiner

*Primary Examiner* — David B Thomas
(74) *Attorney, Agent, or Firm* — Richard C. Litman

(57) ABSTRACT

The magnetized hand tools each include a sleeve of resilient material disposed over each handle or the base of the tool. One or more magnets are installed between the tool handle(s) and the resilient grip(s) covering the handle(s). Alternatively, the tool may have one or more magnets installed in the base, i.e., the drive attachment end, of a socket, with a sleeve being applied over the base of the socket to retain the magnet(s). The socket sleeve has a passage therethrough for the conventional square drive of the ratchet or other tool used to drive the socket. The magnets are recessed into the base of the socket to allow the overlying sleeve portion to lie immediately adjacent to the surface of the socket base, and may be inset into recesses in the tool handles and/or positively attached thereto for more positive retention.

18 Claims, 5 Drawing Sheets

MAGNETIZED HAND TOOLS

CROSS-REFERENCE TO RELATED APPLICATION

This application claims the benefit of U.S. Provisional Patent Application Ser. No. 61/344,270, filed Jun. 21, 2010.

BACKGROUND OF THE INVENTION

1. Field of the Invention

The present invention relates generally to hand tools, and particularly to magnetized hand tools having magnetized handles, bases, or other portions, enabling those tools to be secured removably to a ferrous metal panel for storage or to a ferromagnetic workpiece.

2. Description of the Related Art

Tools in general are configured primarily for their use, with little or no consideration being given to their storage when not in use. Hand tools are often tossed into a tool chest drawer or the like for storage, where they are subject to sliding around and being mixed with other tools each time the drawer is opened or closed and/or the chest is moved. One solution to this problem has been the placement of a padded sheet of material in the bottom of the tool chest drawer, but such relatively soft padded material is often subject to deterioration due to the impact of tools as they are replaced in the drawer, and such material does nothing to retain the tool(s) positively in a specific position in the drawer.

An alternative method of storing tools is provided by a pegboard panel and a series of hooks, pegs, hangers, and/or other fixtures extending from the pegboard. Oftentimes the owners of the tools will mark their desired storage locations on the board, and while this can help to keep the tools organized, it is not a complete answer to the problem. The hooks, hangers, and other fasteners hanging from the pegboard are prone to being dislodged from their attachment holes, and the tools themselves often do not hang or reside neatly in their assigned positions due to their being primarily configured for use rather than storage, as noted further above.

The present inventor is aware of various attempts to provide for the neat and convenient storage of various tools. An example is found in Chinese Patent No. 2,578,055 published on Oct. 8, 2003. This reference describes (according to the drawings and English abstract) different embodiments of tool handles having magnets secured therewith. One of the embodiments comprises molding the tool handle with the magnets embedded therein during the molding process, and further molding a covering sheet of material over the handle and magnets at the time of manufacture of the tool.

Another example is shown in Japanese Patent Publication No. 2004-057,227 published on Feb. 26, 2004. This reference describes (according to the drawings and English abstract) a rice scoop with a magnet embedded in a recess in the handle and retained therein by a cover that is ultrasonically welded in place.

None of the above inventions and patents, taken either singly or in combination, is seen to describe the instant invention as claimed. Thus, magnetized hand tools solving the aforementioned problems are desired.

SUMMARY OF THE INVENTION

The magnetized hand tools each include a sleeve of resilient material disposed over each handle portion or over the base of the tool. Such sleeves are often installed upon the handles of various hand tools at the time of manufacture of the tool or as an aftermarket addition to the tool to provide a more positive grip for the user of the tool. The magnetized hand tools include installation of one or more magnets between the tool handle(s) per se, and the resilient grip(s) covering the handle(s). The magnetized hand tools are extended to include one or more magnets installed in the base, i.e., the drive attachment end of a socket, in which a sleeve may be applied over the base of the socket to retain the magnet(s). The socket sleeve has a passage therethrough for the conventional square drive of the ratchet or other tool used to drive the socket.

The magnets may be adhesively or otherwise positively secured to the tools, in addition to being retained thereon by the resilient sleeves. The tools may include one or more recesses for the magnets so that the magnets nest in the recesses for additional positive retention. The magnets preferably protrude from the surfaces of the tool handles sufficiently to form a series of protuberances in the surfaces of the overlying sleeves, thereby providing uneven surfaces to enhance the grip of the user of the tool. In the case of sockets, the magnets are preferably embedded in the bases of the sockets with little or no protrusion therefrom, enabling the overlying sleeves to lie immediately adjacent to the surfaces of the socket bases. A method of magnetizing hand tools by means of the above-described structure is also provided.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The magnetized hand tools described herein do not necessarily include magnetized working ends to attract ferrous metal parts (screws, etc.) thereto, but may include such magnetism in their working ends or parts, if so desired. Rather, the magnetized hand tools include magnets installed to their handles or bases to facilitate attachment of the tools to a ferrous metal panel or the like for storage, or to a ferromagnetic workpiece.

Figure 1:
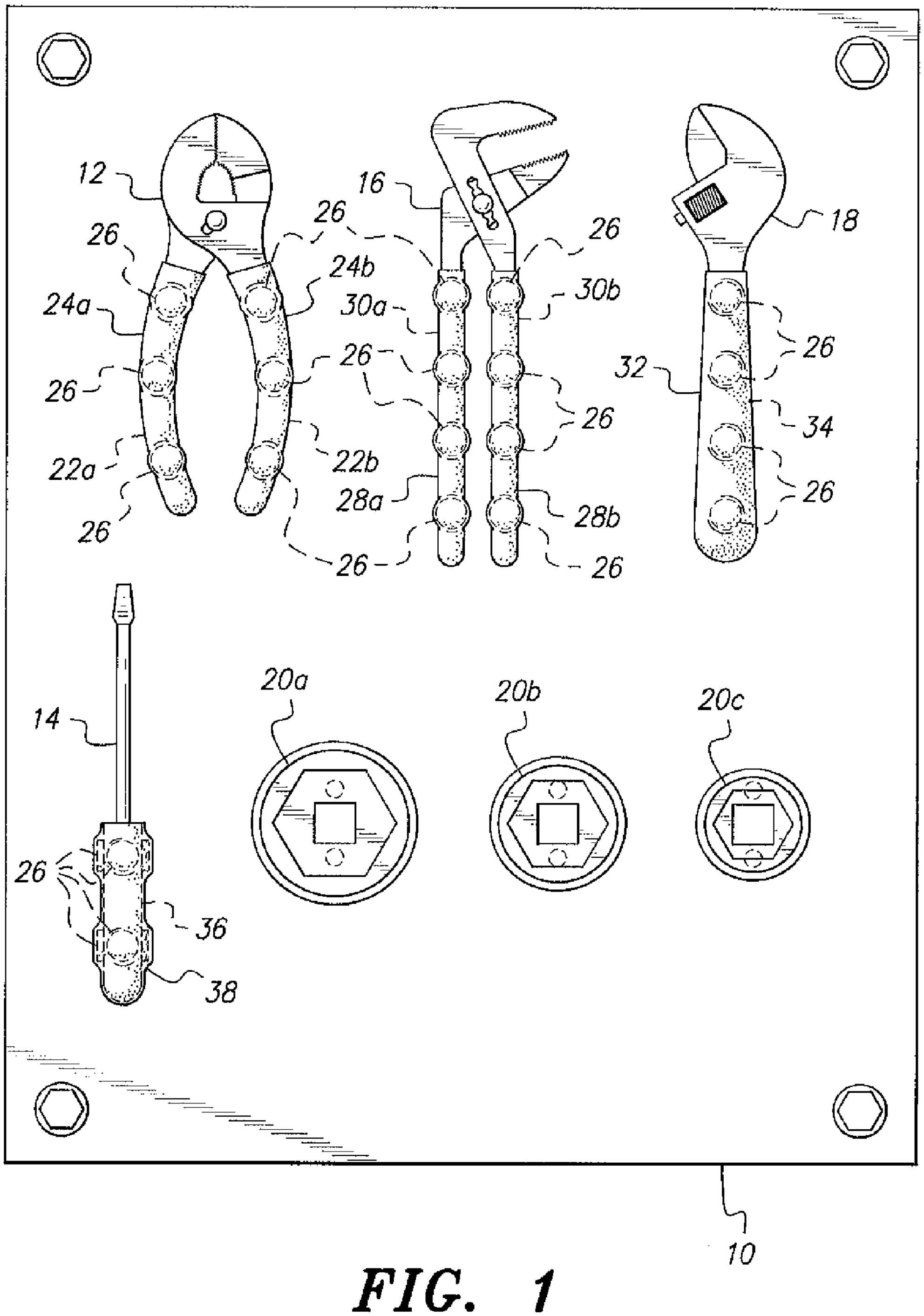
FIG. 1 is an environmental, elevation view of a plurality of magnetized hand tools according to the present invention, shown magnetically attached to a ferrous metal storage panel.

FIG. 1 of the drawings is an illustration of such an arrangement. A ferrous metal tool storage plate 10 is secured to an underlying structure (e.g., garage or shop wall, etc., not shown), and serves as a storage panel or location for the tools of the present invention. It will be seen that the panel or plate 10 need not be a flat sheet of metal, but may be of any practicable configuration or shape so long as it is capable of magnetically retaining another magnetically attractive object(s).

The tool storage plate 10 of FIG. 1 is shown with a plurality of magnetized hand tools magnetically secured thereto, including a pair of slip-joint pliers 12, a screwdriver 14, a pair of Channellock® (sometimes known as "water pump") pliers 16, an adjustable wrench 18, and a series of three sockets 20*a*, 20*b*, and 20*c*. Other magnetized hand tools (not shown), such as hacksaws, hand operated metal shears or snips, hammers, etc. may be stored magnetically on the storage plate or panel 10, as desired.

All of the magnetized hand tools described herein include at least one sleeve attachment portion, i.e., one or more handles in the case of handled tools (such as the pliers 12, 16, screwdriver 14, and wrench 18), or a base in the case of the sockets 20*a* through 20*c*. In the cases of the multi-component tools, e.g., the slip-joint pliers 12, sleeve attachment portions in the form of two handles 22*a* and 22*b* are provided, with each handle 22*a*, 22*b* being concealed beneath its overlying sleeve or grip 24*a*, 24*b*. Such sleeves or grips 24*a*, 24*b* are often applied to the bare metal handles of various hand tools, and are formed of relatively soft and resilient vinyl or other suitable material to enhance the grip of the tool by the user. Such sleeves or grips, e.g., the sleeves or grips 24*a* and 24*b* of the pliers 12, may be removed from the underlying rigid handles if so desired, but they normally remain in place throughout their lives on the tool.

Figure 2:
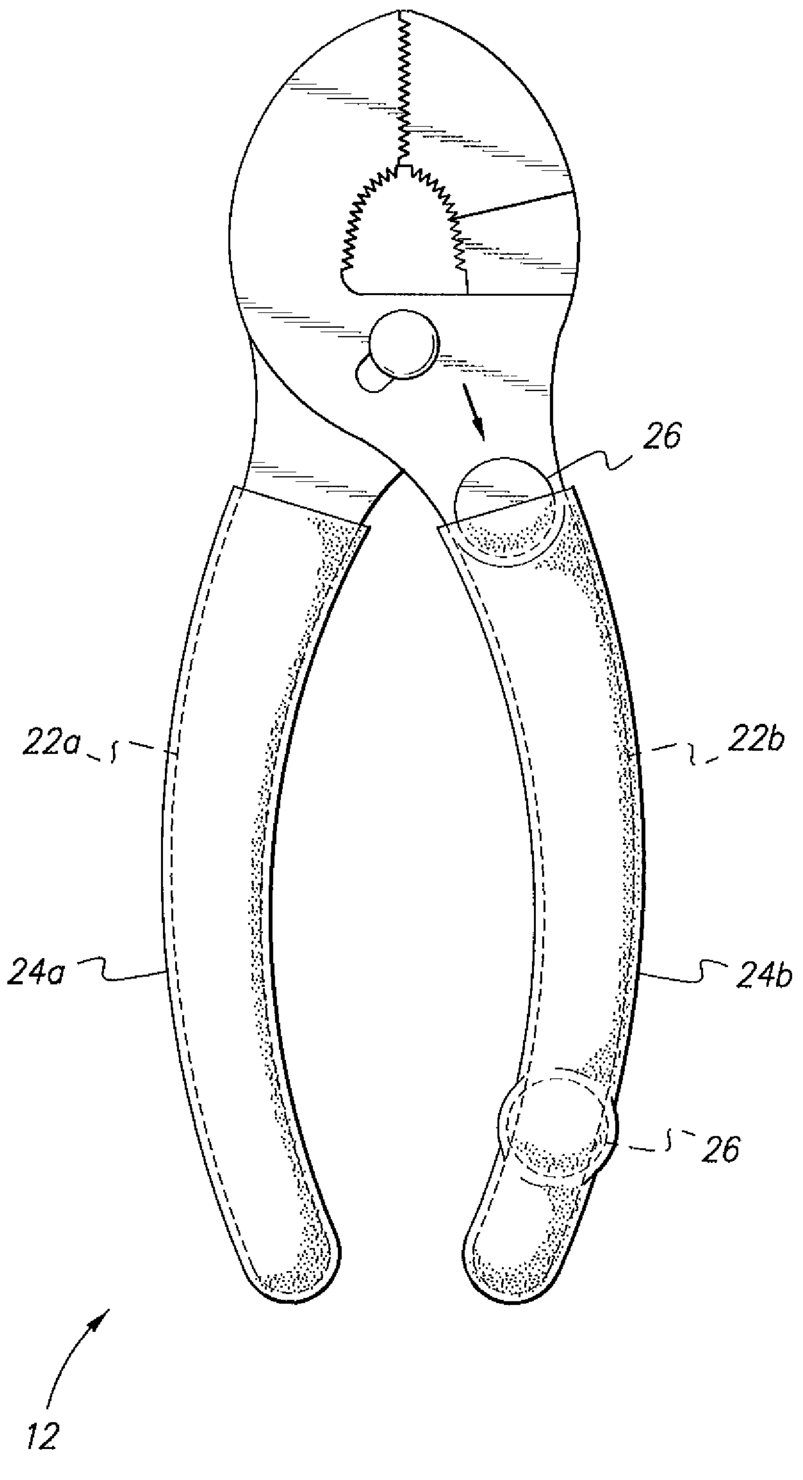
FIG. 2 is an front view of a first embodiment of a magnetized hand tool according to the present invention, showing magnets being installed to the handles of a pair of slip-joint pliers.

One or more magnets 26 (e.g., relatively small "button" magnets 26 of neodymium or other alloy as desired) are inserted between the sleeve attachment portion and the overlying sleeve, with the sleeve capturing the magnet(s) therebeneath. The resilience of the sleeve or grip material allows it to stretch and distend to accept the additional size of the magnet(s) 26 therebeneath. FIG. 2 of the drawings provides an illustration of this procedure, with one magnet 26 having been previously inserted between the sleeve or grip 24*b* and the underlying handle 22*b*, and a second magnet 26 being inserted beneath the open end of the sleeve or grip 24*b* and the underlying base end of the handle 22*b*. The process is continued until sufficient magnets 26 have been installed beneath the resilient grips 24*a*, 24*b* and the underlying handles 22*a*, 22*b*, and along the opposite sides of each handle to result in a completed magnetized pliers tool 12, as shown in FIG. 1. An added benefit of this technique is that the distension of the sleeves or grips 24*a*, 24*b* over the spaced apart magnets 26 captured therebeneath results in an uneven exterior grip surface to provide a more positive grip for the user, as shown in the cases of the pliers 12 and 16, wrench 18, and screwdriver 14 of FIG. 1.

The Channellock® type pliers 16 are provided with magnetism in the same manner as that described above for the slip joint pliers 12. One or more magnets 26 are pushed between the overlying resilient sleeves or grips 28*a* and 28*b* to their desired positions along the handles 30*a* and 30*b*, generally as shown in FIG. 1 of the drawings. Alternatively, the grips or sleeves 28*a*, 28*b* may be removed from the underlying handles 30*a*, 30*b*, the magnets 26 being secured to the handles in some manner (e.g., cementing or adhesively securing, etc.), and the sleeves or grips 28*a*, 28*b* are distended to pass over the magnets 26 as the sleeves or grips are worked back onto the handles. This same process is used to install the magnets beneath the single sleeve or grip 32 of the single handle 34 of the adjustable wrench 18 shown in FIG. 1, and along the two handles of the needle nose pliers 12*a* illustrated in FIG. 5.

Figure 3:
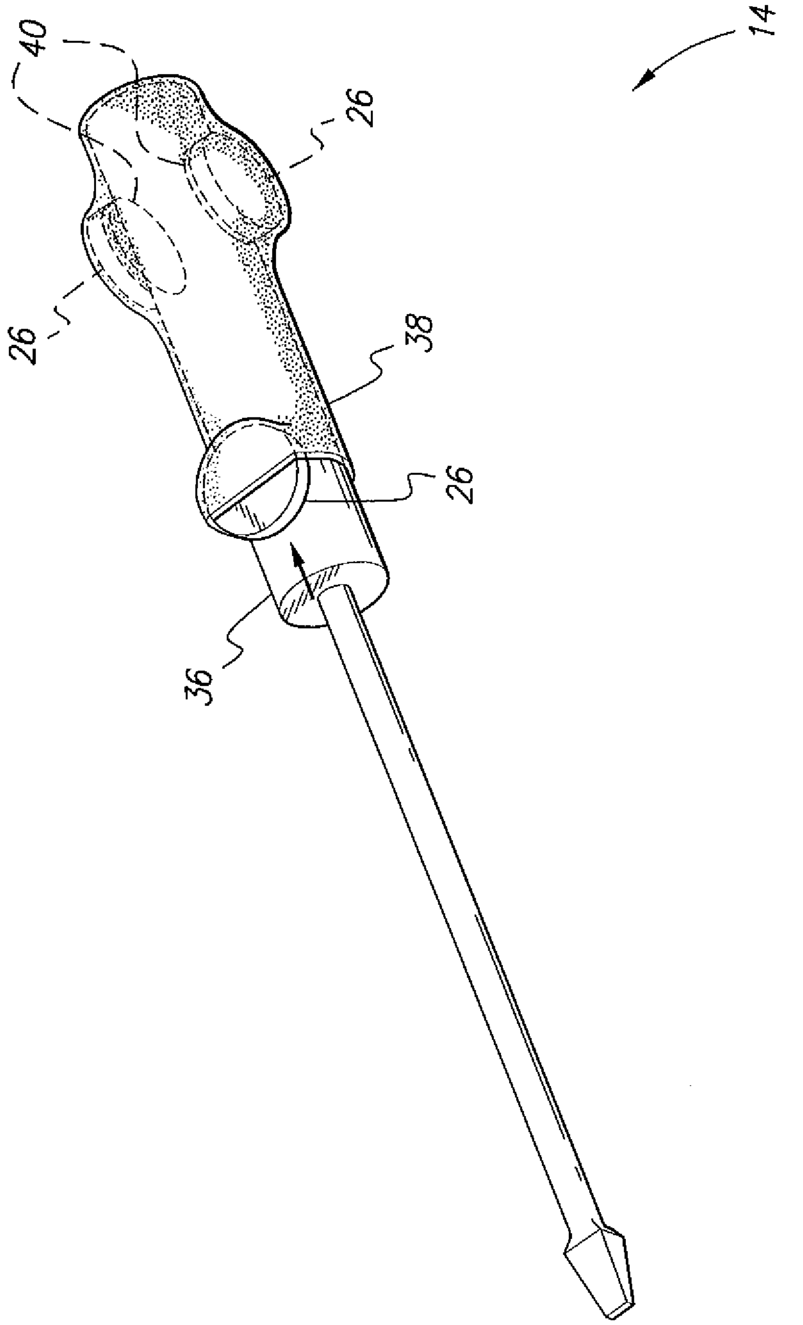
FIG. 3 is a perspective view of a second embodiment of a magnetized hand tool according to the present invention, showing magnets being installed to the handle of a screwdriver.

Much the same procedure is used to install magnets 26 along the handle 36 of the screwdriver 14 of FIG. 3 (or 14*a*, shown in FIG. 5), beneath the overlying sleeve or grip 38. Generally speaking, the handles of screwdrivers are of somewhat larger diameter than the handles of various fulcrum-type tools, such as pliers, the screwdriver handles usually being formed of wood or plastic. This facilitates modification of the handle to provide a seat or receptacle for one or more of the magnets, as shown in FIG. 3 of the drawings. The handle 36 includes seats or receptacles 40 therein, in which the magnets 26 are seated for more positive retention. It should be noted that a magnet 26 may be placed at the end of the handle 36 in addition to those positioned along the sides of the handle, if so desired. The sleeve or grip 38 is passed over the handle 36, the seated magnets 26 being retained in their positions by their respective receptacles or seats 40. Alternatively, the grip or sleeve 38 may be replaced after the receptacles 40 have been formed in the handle 36, and the magnets 26 pushed between the grip or sleeve 38 and the underlying handle 36 until they reach their receptacles or seats 40. The same process may be used with the metal handles of the various pliers and the wrench 12, 16, and 18 discussed further above, but the formation of magnet receptacles or seats in the relatively narrow metal handles of those tools may not be practicable.

Figure 4:
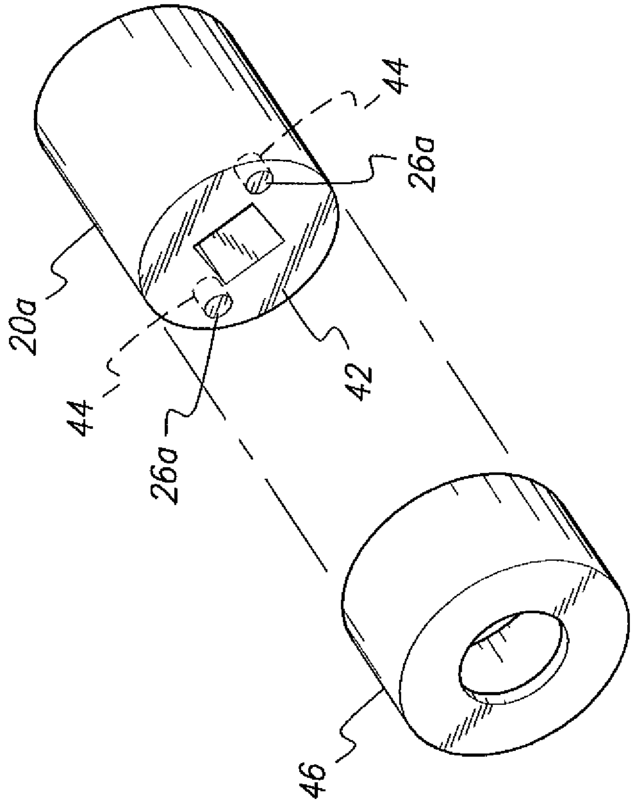
FIG. 4 is an exploded perspective view of a third embodiment of a magnetized hand tool according to the present invention, showing magnets installed upon a socket, the magnet retaining sleeve being shown exploded from the socket.

FIG. 4 is an illustration of the installation of magnets on or in a tool comprising a socket 20*a*. The socket 20*a* shown in FIG. 4 is essentially identical to the large socket 20*a* shown in FIG. 1, but it will be seen that the process is applicable to other socket sizes, e.g., sockets 20*b* and 20*c* of FIG. 1, as well. The socket 20*a* includes a base or ratchet square drive attachment end or portion 42, with a pair of smaller magnets 26*a* seated therein. Preferably, magnet seats or receptacles 44 are formed in the drive attachment end 42 of the socket 20*a*, to allow the outer faces of the magnets 26*a* to lie flush with the end surface of the socket. This allows the end of the sleeve 46 to be positioned in contact with the drive end 42 of the socket 20*a* as it captures the magnets 26*a* therebeneath, to preclude interference with the engagement of the square ratchet drive with the socket 20*a*. Alternatively, the magnets 26*a* (or other magnet type) may be installed upon the surface of the drive end 42 of the socket 20*a* (or other sockets), with the result being that the end of the sleeve 46 will be displaced away from the drive end of the socket by the thickness of the magnets.

Figure 5:
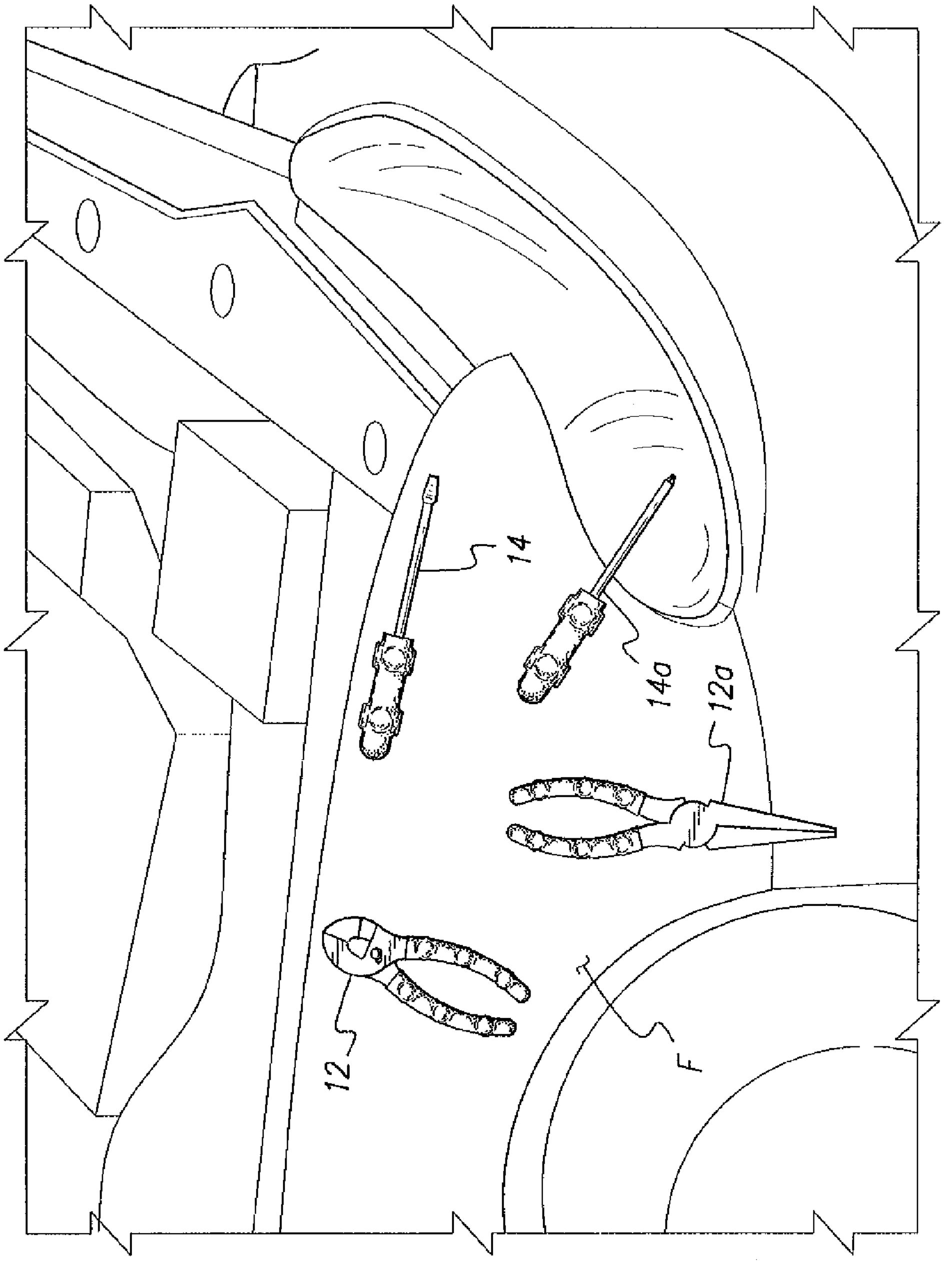
FIG. 5 is an environmental perspective view of a plurality of magnetized hand tools according to the present invention, showing retention of the tools with their magnetically attractive handles upon a ferrous metal panel while working.

FIG. 5 illustrates an exemplary additional function of the magnetized hand tools 12, 12*a*, 14, and 14*a*, in which they are temporarily and removably attached magnetically to the ferrous metal fender F of an automobile for handy access to the tools while working on the car. It will be seen that the other tools illustrated in FIG. 1, as well as others adapted for magnetizing in accordance with the process described herein, may be magnetically secured to such a fender panel F or other ferrous metal panel or surface while working, if so desired.

It is to be understood that the present invention is not limited to the embodiments described above, but encompasses any and all embodiments within the scope of the following claims.

I claim:

1. A magnetized hand tool, comprising:

a tool having at least one sleeve attachment portion;

a resilient sleeve removably and distensibly disposed about the sleeve attachment portion; and at least one magnet disposed between the sleeve attachment portion and the sleeve.

2. The magnetized hand tool according to claim 1, further including a ferrous metal tool storage plate in combination therewith.

3. The magnetized hand tool according to claim 1, wherein:

the sleeve attachment portion of the tool is a handle; and the at least one magnet is captured between the handle and the sleeve, thereby distending the sleeve and forming an uneven grip surface for the handle.

4. The magnetized hand tool according to claim 3, wherein the tool is selected from the group consisting of pliers, screwdrivers, and wrenches.

5. The magnetized hand tool according to claim 1, wherein:

the sleeve attachment portion of the tool is a socket base; and the at least one magnet is captured between the socket base and the sleeve.

6. The magnetized hand tool according to claim 5, wherein the tool is a square drive socket.

7. The magnetized hand tool according to claim 1, wherein the sleeve attachment portion includes at least one magnet receptacle therein.

8. A magnetized hand tool and a storage plate therewith, comprising in combination:

a tool having at least one sleeve attachment portion;

a resilient sleeve removably and distensibly disposed about the sleeve attachment portion;

at least one magnet disposed between the sleeve attachment portion and the sleeve; and a ferrous metal tool storage plate adapted for the magnetic retention of at least one magnetized hand tool thereon.

9. The magnetized hand tool and storage plate combination according to claim 8, wherein:

the sleeve attachment portion of the tool is a handle; and the at least one magnet is captured between the handle and the sleeve, thereby distending the sleeve and forming an uneven grip surface for the handle.

10. The magnetized hand tool and storage plate combination according to claim 9, wherein the tool is selected from the group consisting of pliers, screwdrivers, and wrenches.

11. The magnetized hand tool and storage plate combination according to claim 8, wherein:

the sleeve attachment portion of the tool is a socket base; and the at least one magnet is captured between the socket base and the sleeve.

12. The magnetized hand tool and storage plate combination according to claim 11, wherein the tool is a square drive socket.

13. The magnetized hand tool and storage plate combination according to claim 8, wherein the sleeve attachment portion includes at least one magnet receptacle therein.

14. A method of magnetizing a hand tool for the convenient storage thereof, comprising the steps of:

(a) providing a hand tool having at least one sleeve attachment portion;

(b) removably installing a distensible sleeve over the sleeve attachment portion of the hand tool; and (c) installing at least one magnet between the sleeve attachment portion of the hand tool and the sleeve, thereby capturing the magnet between the sleeve attachment portion and the sleeve.

15. The method of magnetizing a hand tool according to the method of claim 14, further including the steps of:

(a) providing a ferrous metal tool storage plate; and (b) removably storing at least one magnetized hand tool thereon.

16. The method of magnetizing a hand tool according to the method of claim 14, further including the steps of:

forming the sleeve attachment portion of the tool as a handle;

capturing the at least one magnet between the handle and the sleeve; and distending the sleeve by means of the at least one magnet captured thereunder, thereby forming an uneven grip surface for the handle.

17. The method of magnetizing a hand tool according to the method of claim 14, further including the steps of:

forming the sleeve attachment portion of the tool as the square drive end of a socket; and capturing the at least one magnet between the socket base and the sleeve.

18. The method of magnetizing a hand tool according to the method of claim 14, further including the steps of:

(a) forming a receptacle in the sleeve attachment portion of the tool; and (b) seating the magnet within the receptacle.

* * * * *